(12) United States Patent
Breuer et al.

(10) Patent No.: US 10,547,994 B2
(45) Date of Patent: Jan. 28, 2020

(54) STORAGE ELEMENTS WITH LABEL IDENTIFICATION FOR A WAREHOUSE

(71) Applicant: INTERNATIONAL BUSINESS MACHINES CORPORATION, Armonk, NY (US)

(72) Inventors: Marcus Breuer, Dalheim (DE); Bernd Freitag, Partenheim (DE); Frank Krick, Ockenheim (DE); Tim Oswald, Gimbsheim (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 11 days.

(21) Appl. No.: 15/408,716

(22) Filed: Jan. 18, 2017

(65) Prior Publication Data
US 2018/0206061 A1    Jul. 19, 2018

(51) Int. Cl.
*H04W 4/80* (2018.01)
*G06F 13/40* (2006.01)

(52) U.S. Cl.
CPC .......... *H04W 4/80* (2018.02); *G06F 13/4022* (2013.01)

(58) Field of Classification Search
CPC ... H04W 4/008; H04W 84/18; G06F 13/4022; G06K 7/0008; G06K 19/0723; G06K 7/10316; G06K 7/10178; G06K 19/07749; H04L 67/12; H04L 67/04; H01Q 1/2216; G08B 13/2474; G08B 13/2445; G08B 13/2417
See application file for complete search history.

(56) References Cited

U.S. PATENT DOCUMENTS

| | | | |
|---|---|---|---|
| 7,701,348 B2 | 4/2010 | Kim | |
| 7,865,398 B2 | 1/2011 | Schon | |
| 2006/0232382 A1 | 10/2006 | Bauer et al. | |
| 2006/0255949 A1* | 11/2006 | Roeder | B62B 3/06 340/572.7 |
| 2007/0008139 A1* | 1/2007 | Saarisalo | G06K 7/0008 340/572.7 |
| 2007/0182559 A1* | 8/2007 | Lawrence | G06K 19/07749 340/572.7 |

(Continued)

OTHER PUBLICATIONS

RFID UHF chip pallet, YouTube, 2012 https://www.youtube.com/watch?v=OHRbTy76HPs.*

(Continued)

*Primary Examiner* — Jianxun Yang
(74) *Attorney, Agent, or Firm* — Griffiths & Seaton PLLC

(57) ABSTRACT

A storage element for a warehouse rack may be provided. The storage element is adapted for housing goods and can be positioned compact in at least two dimensions. The storage element comprises a computing device comprising a memory storing at least a unique identifier and data about the goods housed by the storage element, a plurality of antennas external to the computing device mounted at outer sides of the storage element. The antennas are adapted for a communication to antennas of neighboring storage elements. The antennas are electrically connectable to the computing device. The storage element also comprises a switch controller adapted for switchable connecting one of the plurality of antennas to the computing device at a time.

12 Claims, 7 Drawing Sheets

(56) References Cited

U.S. PATENT DOCUMENTS

| | | | |
|---|---|---|---|
| 2010/0134257 A1* | 6/2010 | Puleston | G06K 7/0008 340/10.4 |
| 2012/0075071 A1* | 3/2012 | Liu | B65D 19/001 340/10.1 |
| 2014/0085052 A1 | 3/2014 | Singh et al. | |
| 2014/0225560 A1* | 8/2014 | Walley | H01M 2/0267 320/108 |

OTHER PUBLICATIONS

EPAL pallet system, Pique, 2010 https://www.slideshare.net/pique10/epal-presentation-at-rfid-journal-live-europe (Year: 2010).*

Das, "Using RFID for Warehouse Management," http://wikibon.org/wiki/v/Using_RFID_for_warehouse_management, Feb. 15, 2008 (5 pages).

Ropraz, "Using RFID for Supply Chain Management," http://diuf.unifr.ch/main/is/sites/diuf.unifr.ch.main.is/files/file/courses/eBiz_fs08/fabien_ropraz_eBusiness_RFID_Paper.pdf, Universite De Fribourg Suisse, May 2008 (36 pages).

\* cited by examiner 100 storage element
FIG. 1a
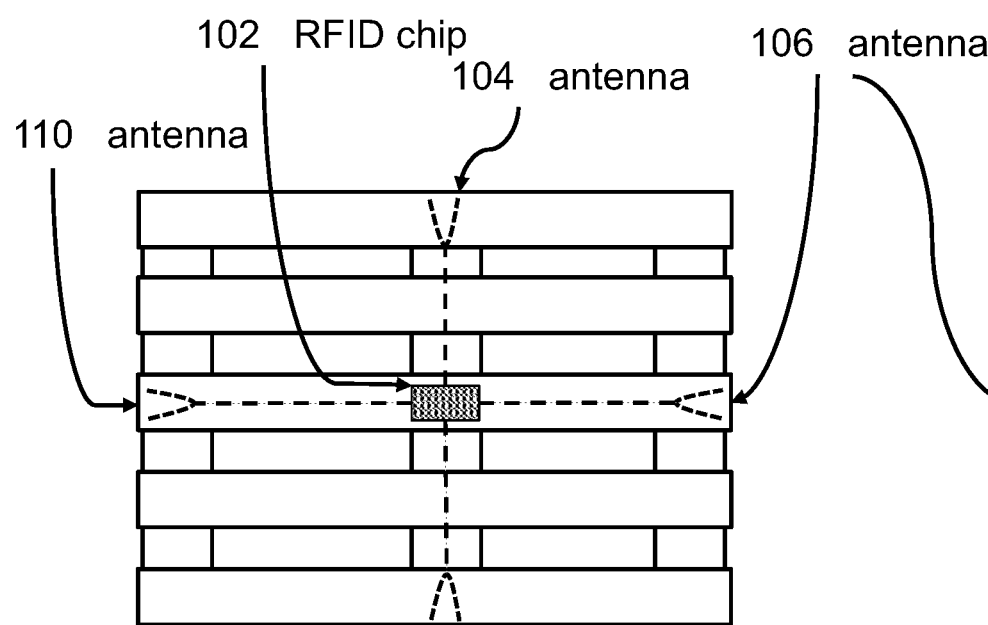
102 RFID chip
104 antenna
106 antenna
110 antenna
FIG. 1c
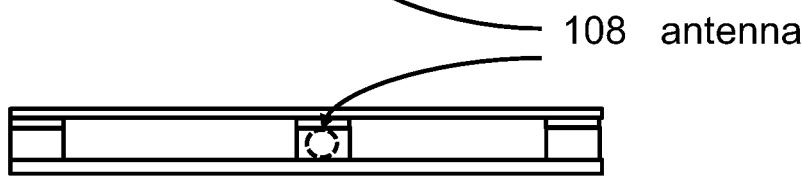
108 antenna
FIG. 1b

700　method 702　storing a plurality of storage elements in at least 2 dimensions 704　storing at least a unique ID and data about good housed in a computing device integral to the storage 706　connecting one of a plurality of RFID antennas to the computing device of a storage element 708　communicating the unique ID and the data about the goods housed from one computing device of one storage element to a neighboring computing device of a neighboring storage element

FIG. 7

STORAGE ELEMENTS WITH LABEL IDENTIFICATION FOR A WAREHOUSE

FIELD OF THE INVENTION

The invention relates generally to a storage element like a pallet for a warehouse rack, and more specifically, to computing and communication equipment integrated in the storage element. The invention relates further to a method for managing a plurality of storage elements, and a computer program product.

BACKGROUND

In logistical mass storage facilities huge number of pallets are stored in high racks, and to inventory is very time-consuming and sometimes impossible during normal operations. It has massive impact on operation and costs in case no actual inventory list is available.

Additionally, pallets are not only stored in high racks but also on tracks, trailers, ships, railway wagons and on construction sites in a compact form, i.e., without any space between the pallets. Thus, it is impossible to walk from pallet to pallet and check manually the palletized goods. Such a two-dimensional compact placement of pallets is commonplace in order to use the available storage capacity to a maximum. This is in contradiction to perform inventory operations at any point in time in order to keep track and control the goods actually stored in/on a plurality of storage elements/pallets.

On the other side, there is a strong requirement to control the availability of goods and raw material at any time even if the pallets below the goods and raw material are positioned in a compact form on a surface, like a high rack, a ship deck, a truck or trailer, any intermediate storage space, a construction site, and so on.

Especially, in case no organizational and technical infrastructure is present—like any place outside a high rack—it is difficult to electronically read out inventory data because the pallets are not accessible due to its compact placement in storage lots, including intermediate storage locations.

SUMMARY

According to one aspect of the present invention, a storage element—in particular for a warehouse rack—may be provided. The storage elements may be adapted for housing goods. The storage elements may be adapted to be stored compact in at least two dimensions. The storage element may comprise a computing device comprising a memory storing at least a unique identifier and data about the goods housed on/by the storage element. The storage element may also comprise a plurality of antennas external to the computing device and mounted at outer sides of the storage element. The antennas may be adapted for a communication to antennas of neighboring storage elements. The antennas may be electrically connectable to the computing device. Also part of the storage element is a switch controller adapted for switchable connecting one of the plurality of antennas to the computing device at a time.

According to another aspect of the present invention, a method for managing a plurality of storage elements may be provided. The storage elements may be adapted for housing goods. The storage elements may also be adapted to be stored in a compact manner in at least two dimensions. The method may comprise positioning the plurality of storage elements in a plane, i.e., in at least two dimensions, and storing—electronically—at least a unique identifier value and data about the goods housed by one of the plurality of storage elements in a computing device integral to the one storage element. Each of the computing devices may comprise a memory. A plurality of antennas may be mounted at an outer side of each of the plurality of the storage elements. The antennas may be electrically connectable to the related computing device integrated in each respected one of the plurality of storage elements.

The method may comprise further connecting, by a switch controller, one of the plurality of the antennas to the related computing device, and communicating data from one computing device integral to a first storage element to a computing device integral to a neighboring storage element via one of the plurality of antennas of the first storage element to the neighboring storage element via a corresponding one of the plurality of the antennas of the neighboring storage element.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

Preferred embodiments of the invention will be described, by way of example only, and with reference to the following drawings:

FIG. 1a-c shows a block diagram of an embodiment of the inventive storage element.

Figure 2:
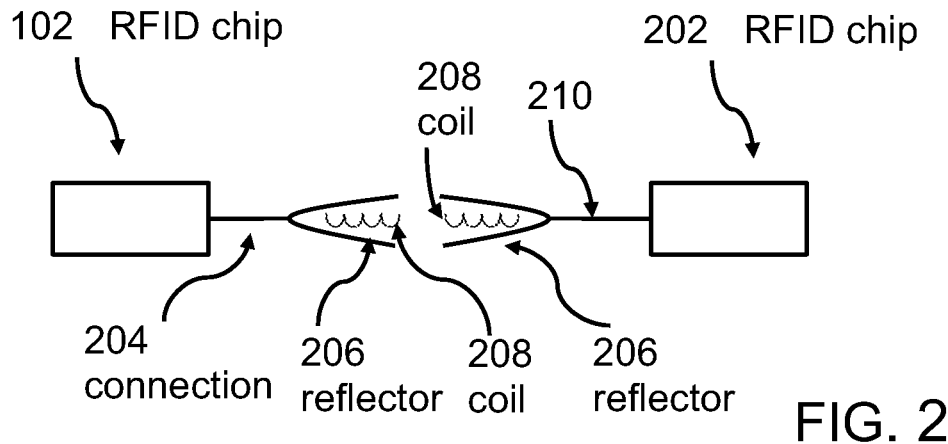

FIG. 2 shows a block diagram of a positioning of two antennas of neighboring storage elements.

Figure 3:
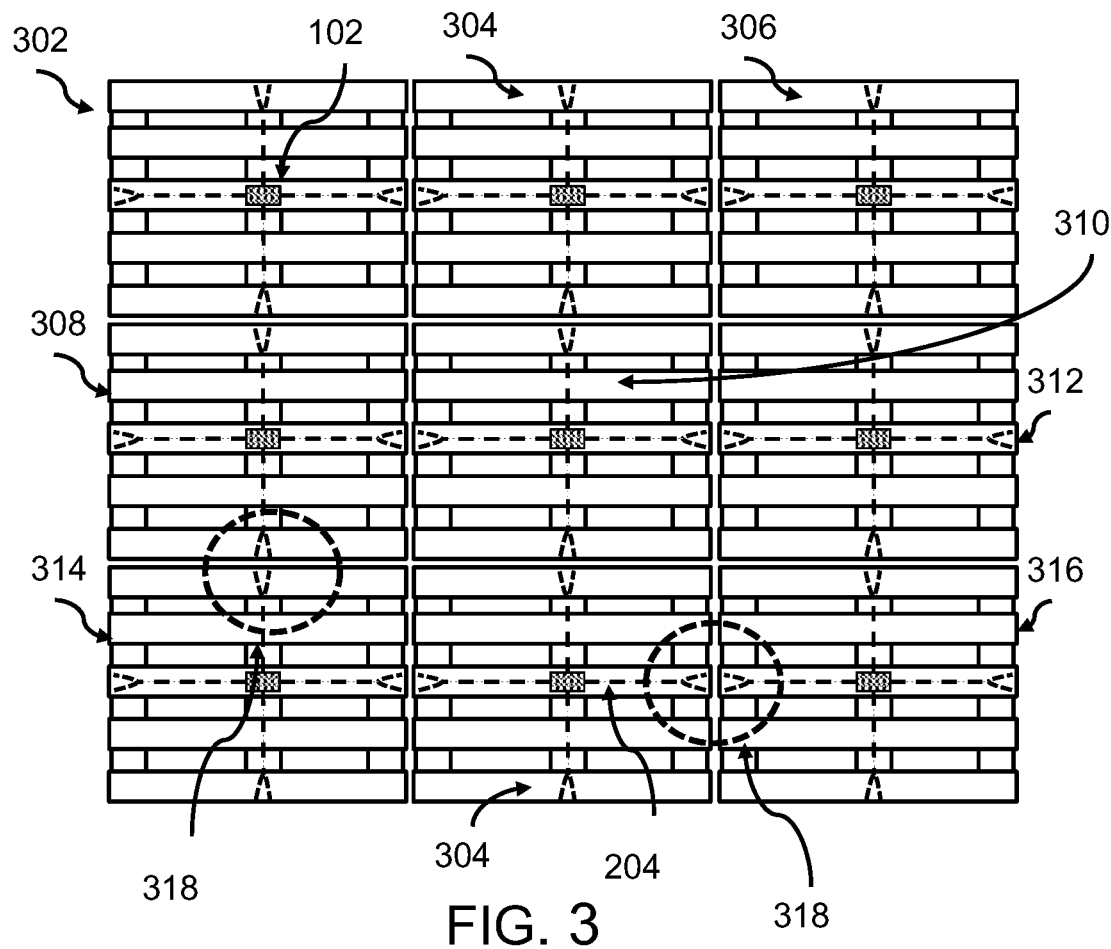

FIG. 3 shows a block diagram of a top view of an array of storage elements.

Figure 4:
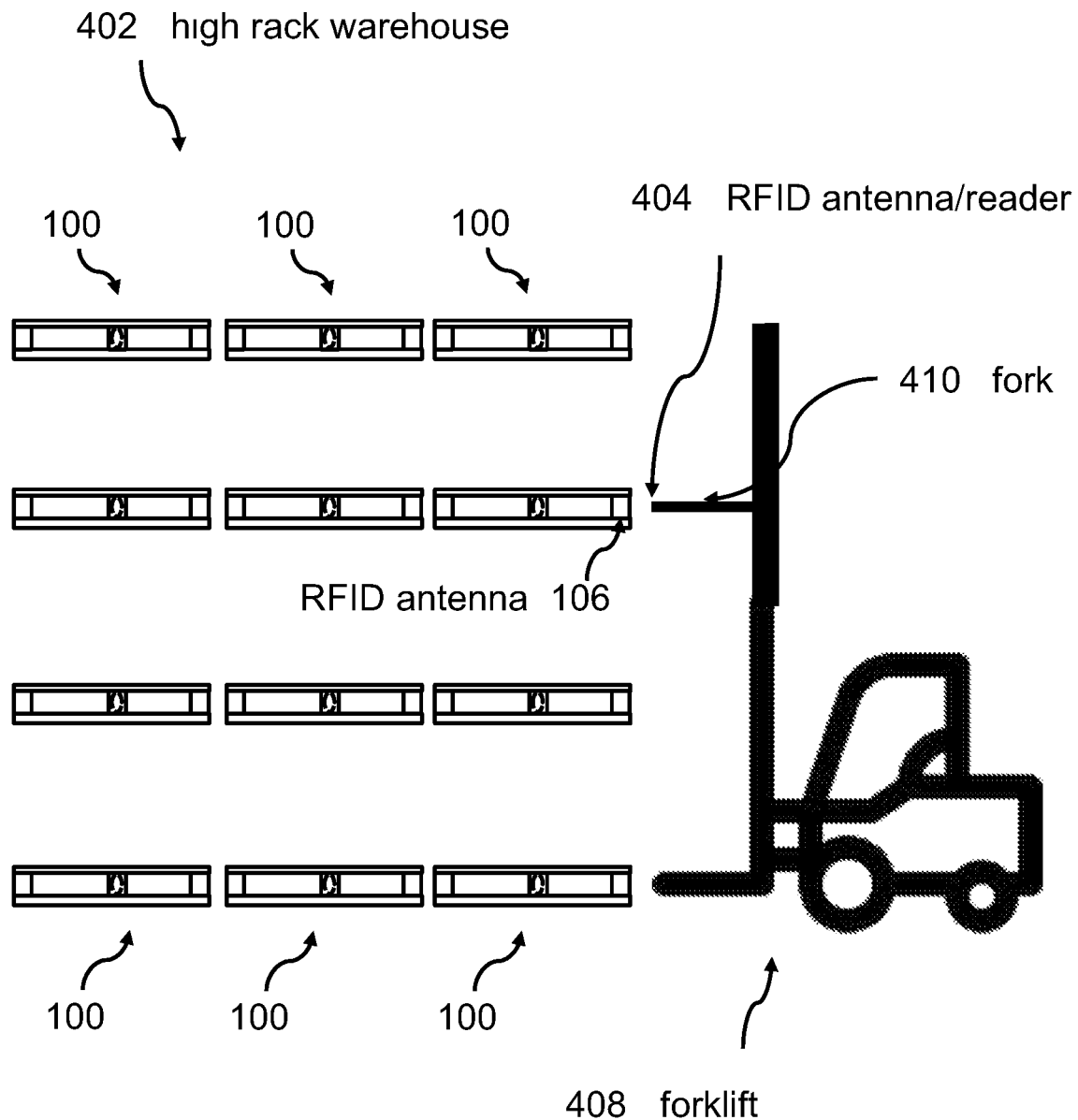

FIG. 4 shows a block diagram of an embodiment of a plurality of storage elements in a high rack warehouse.

Figure 5:
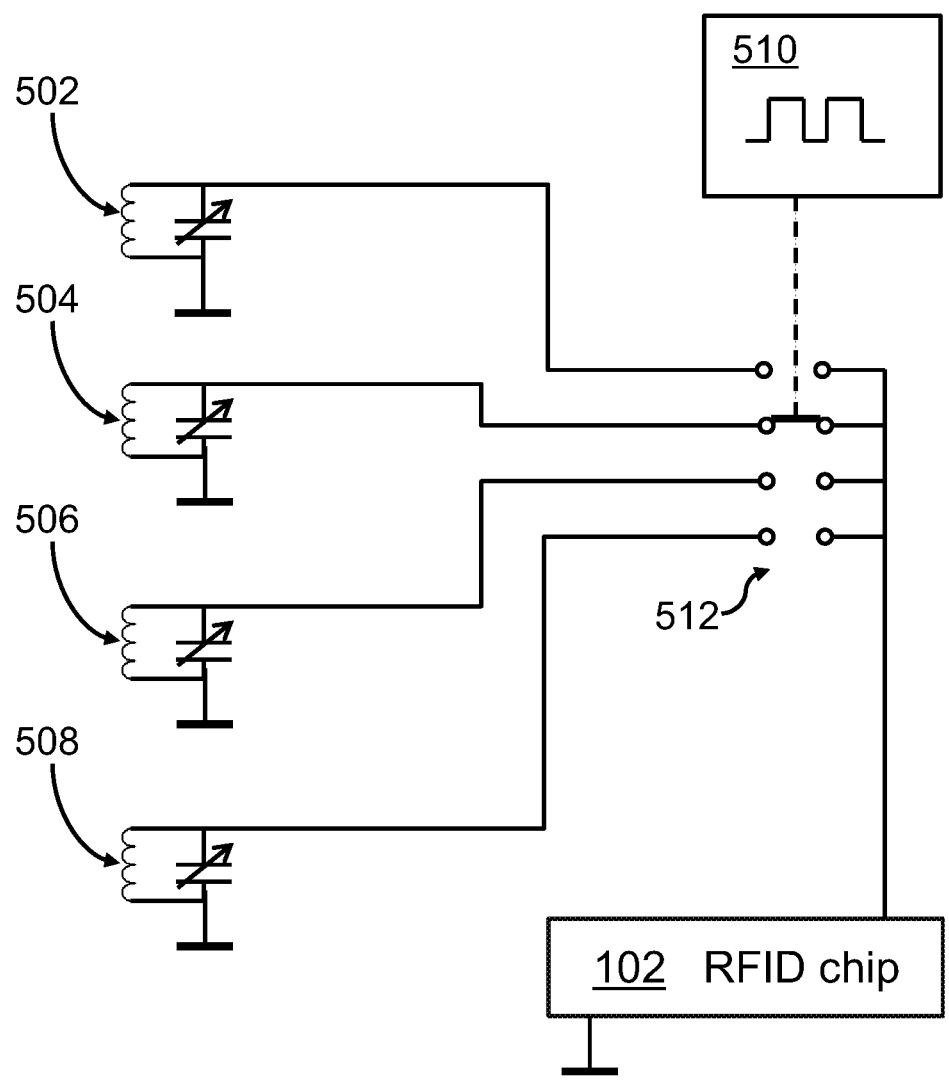

FIG. 5 shows an embodiment of the computing device/RFID chip connected to the switch controller 510 and a plurality of resonance circuits.

Figure 6:
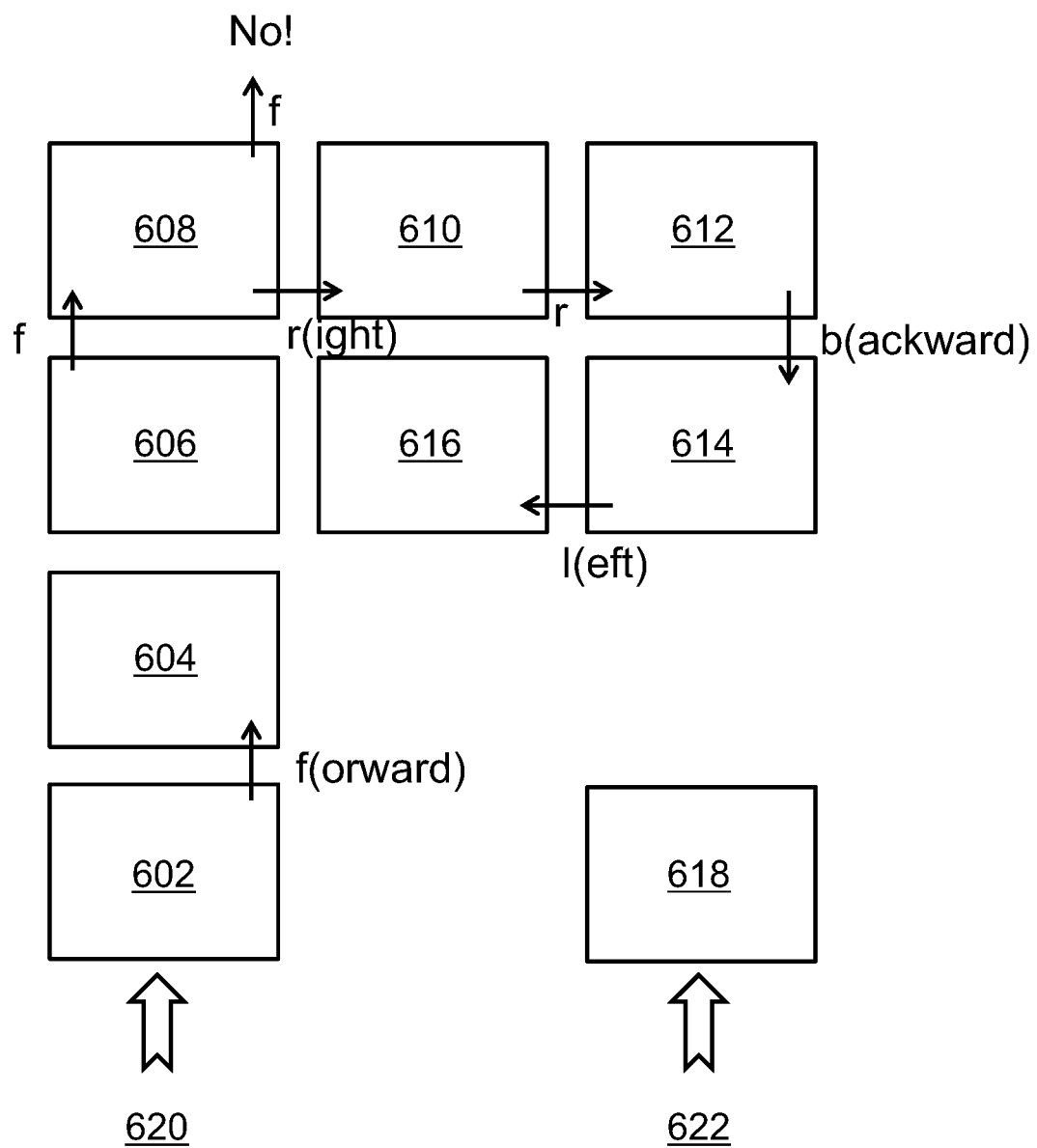

FIG. 6 shows an exemplary placement of a plurality of storage elements.

FIG. 7 shows an exemplary flowchart of a related method for handling or managing storage elements.

Figure 8:
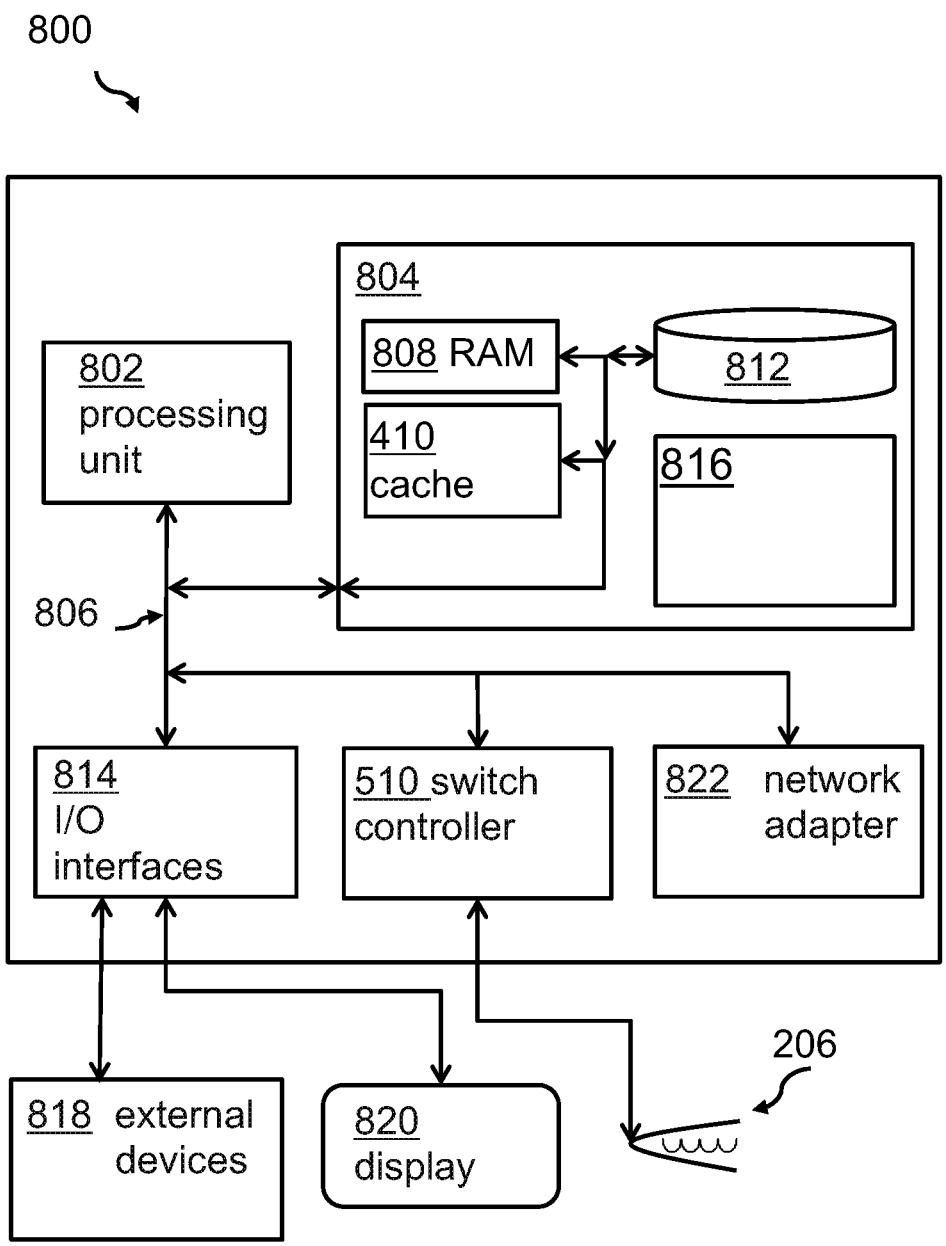

FIG. 8 shows an embodiment of a computing system instrumental for the here proposed concept.

DETAILED DESCRIPTION

In the context of this description, the following conventions, terms and/or expressions may be used:

The term 'storage element' may denote a platform for transporting or storing physical goods. The storage element may take the form of a pallet, a box, a container, a sack, etc. In general, the storage element may have a rectangular form. However, other forms like triangles or circles as ground surface are not excluded.

The term 'warehouse rack' may denote a rack in a warehouse with regular rows and columns organized in at least two dimensions alternatively, in three dimensions. Each layer of the warehouse rack—typically a high rack—may allow a compact storage of storage elements.

The term 'housing goods' may denote that each storage container is adapted to carry goods. The goods may be positioned on the pallet or in the storage container or in the box acting as storage element.

The term 'stored compact' may denote that the storage elements may be positioned side-by-side with just little or no space between adjacent storage elements. No hallways, corridors or aisles may be provided between the different storage elements in one layer.

The term 'computing device' may denote a single board computer, single-chip computer or RFID chip equipped with a processor and a respective memory. The computing device may be equipped with a rechargeable battery. The communication to/from the computing device/RFID chip may be performed using antennas for typical RFID frequencies, e.g., 13.56 MHz. However, any other RF communication is as good as the typical RFID frequencies.

The term 'antenna' may denote coils positioned within reflectors which themselves are positioned at outer sides of the storage elements, e.g., in the middle of each side of a rectangular pallet. Their primary communication coil is directed in a horizontal direction to a neighboring antenna from another storage container. An external RFID reader—which may optionally function as charger for the rechargeable batteries—may be positioned in front of the respective antenna. Such an RFID reader may be used to read—via the primary contacted storage element—data from all storage elements.

The term 'neighboring storage element' may denote a storage element positioned side-by-side or adjacent to another storage element. No space, or hallway, or corridor, may be provided between neighboring storage elements.

The term 'switch controller' may denote a controller connected to a switch which may be enabled to connect a resonant circuit to the computing device being integral to the storage element. In receiving mode, the switchable controller may connect one resonant circuit at a time to the computing device/RFID chip. In a receiving mode of the computing device/RFID chip, all four antennas may be connected together to the computing device/RFID chip. The computing device/RFID chip may be enabled to determine which of the plurality of antennas may have received a respective signal.

The proposed storage element for a warehouse rack may offer multiple advantages and technical effects:

Making the storage elements, i.e., pallets or containers, intelligent, enables and enhances the ability to do inventory operations even if the storage elements are positioned in a compact, two-dimensional manner. It is not required to be able to reach each storage element surrounded by other storage elements because the storage elements, i.e., electronic enhancements of the storage elements, are able to communicate from storage element to storage element in a store and forward manner. Any kind of track algorithm may be used in order to read-out the information stored in the memory of the computing devices, e.g., RFID chips, which may be integrated in the storage element. Integrating RFID chips into storage elements like pallets does not represent major additional costs. The RFID chip itself as well as the required antennas may be integrated in this construction of the pallet itself. And thus, the newly integrated technology may be protected by the construction of the pallet.

Additionally, and in contrast to barcodes stuck on the storage elements, the information stored in the RFID chips can be changed anytime reflecting a changed quantity of goods housed by the storage element. No printing of new barcodes and positioning them on the pallet may be required. Also in comparison to a simple bar-code label, the RFID chip can hold/store the list of containing and/or quantity of the goods on the pallet. This self-describing service may also help to re-construct the inventory in case the warehouse management system is down or broken.

The proposed storage element, as well as the related method, may also work outside the contained environment of a high rack, e.g., on construction sites and transport vehicles, like trucks, trailers, ships, containers, and so on.

A read-out of the content of the memory as part of the computing device/RFID chip may be made by an RFID reader positioned at an end of a fork of the forklift or by positioning an RFID reader at any side of the pallet, facing an antenna of a respective storage element in, e.g., a high rack. Thus, the inventory read-out may be performed at any place also outside the contained environment of the high rack. This may ensure a much better control of logistical chains from a storage in a high rack warehouse, via transportation vehicles to storage areas at destinations even if the storage areas are not equipped with the required technology to read-out the goods contained in/on a plurality of storage elements.

In the following some additional embodiment will be described:

According to one advantageous embodiment of the storage element, the switch controller may be a component of the computing device. This may allow a cost-effective implementation and reduces the risk of damage of the computing device/switch controller combination. In one embodiment, the switch may be integral to the switch controller.

According to one optional embodiment of the storage element, the computing device may be connected—in particular electrically—to a rechargeable battery. Alternatively, the rechargeable battery may be an integral part of the computing device. The rechargeable battery may e.g., be a lithium-polymer battery which has the advantage of having a long lifetime and good weight-to-capacity ratio and basically no memory effect. The computing device may be powered by the rechargeable battery. Additionally, the rechargeable battery of the storage element may also be changed using solar panels integrated in the storage element.

According to an additionally optional embodiment of the storage element, the rechargeable battery may be charged by an RFID reader. Thus, an RFID reader may activate the computing device—in particular an RFID chip—and may charge the rechargeable batteries at the same time. However, the rechargeable battery may also be loaded outside communication times by the RFID reader.

According to one permissive embodiment of the storage element, the rechargeable battery may be charged by a voice coil charger. This may allow for a good coupling degree between the charger and the respective antenna.

According to one advantageous embodiment of the storage element, each of the plurality of antennas may comprise an antenna coil, a capacitor and a signal amplifier. Thus, the weak signals from the resonant circuit may not be transferred over a longer distance to the central computing device or RFID chip, but may firstly be amplified.

According to another advantageous embodiment of the storage element, the unique identifier of the computing device may be its IP (Internet Protocol) address. With this, an easy way for unique addresses may be available. Addressing mistakes may be excluded.

According to one additional advantageous embodiment of the storage element, the storage element may be adapted to slide down a wedged warehouse rack. This may have the advantage that—in a layer of the warehouse rack—the first position of the warehouse rack may always be occupied if a storage element is positioned in a row of the warehouse rack. The storage element slides always to the first position at a corridor to enable a read-out of the data in the computing device of the storage element.

According to one preferred embodiment of the storage element, the switch controller may also be adapted for connecting the plurality of antennas to the computing device at the same time in a receiving mode of the computing device. Thus, the computing device may be operable in two modes: (a) in listening mode in which all antennas—e.g., four antennas, one on each side—may be connected to the computing device, e.g., an RFID chip. In an alternative mode—in particular a sending mode of the computing device—one antenna may be selected at one point in time so that a directed communication to a specific neighboring storage element may be possible. This way, the computing element of the storage element may decide in which direction a communication channel may be established to a neighboring storage element.

According to a further advanced embodiment of the storage element, the computing device may be an RFID chip comprising at least a processing unit and an integrated RF receiver, and the antennas of the RFID chip. Hence, an implementation, using an RFID chip as computing device may be pretty cost effective and does not require a high degree of power consumption.

In the following, a detailed description of the figures will be given. All instructions in the figures are schematic. Firstly, a block diagram of an embodiment of the inventive storage element for a warehouse rack is given. Afterwards, further embodiments, as well as embodiments of the method for managing a plurality of storage elements, will be described.

FIG. 1a shows a block diagram of an embodiment of the novel storage element 100. The storage element 100 may be a pallet or container for housing physical goods. The storage element 100 may be adapted for use in a high rack. Additionally, the storage element may also be used in conjunction with any transportation equipment in which the storage elements may be positioned side-by-side in a compact form, i.e., without any space between the storage elements. The compact form may be a two-dimensional array of storage elements. However, it is possible that the array may not fill at every position. It may also be possible to handle storage elements of different sizes. Typically, a base size, a double size and a quadruple size may be useful.

The transportation equipment may, e.g., be a truck, a trailer, a ship deck, a train wagon, or any other place were the storage elements 100 may be positioned, e.g., at a construction site.

Each of a plurality of storage elements 100 may comprise a computing device 102, e.g., an RFID chip 102. However, also other forms of single-chip or single board computers may be used in the context of the proposed system. The computing device has a memory to store at least a unique identifier and data about the goods housed by the storage element. It may be noted that the memory of the computing device may be a non-volatile memory.

The storage element also comprises a plurality of antennas 104, 106, 108, 110 external to the computing device. The computing device may advantageously be positioned in the center of the pallet/storage element below a surface element so that the computing device may be protected easily. Typically, the antennas 104, 106, 108, 110 may be positioned symmetrically at sides of the storage element as shown in the FIGS. 1a, 1b and 1c. FIGS. 1b and 1c show the storage element from the side. It may be mentioned that the transportation pallet shown in the figures may only be one example of a storage element. The storage element may also come as a container or any other object suited to house physical goods for transportation purposes in which the here proposed computing device and antennas may be integrated.

If the storage element has a rectangular form—as shown in FIGS. 1a, b, c—the antennas 104, 106, 108, 110 may be positioned laterally in the middle of opposite sides of the storage element 100.

The antennas are electrically connectable to the computing device, e.g., the RFID chip and a switch controller which is adapted for switchable connecting one of the plurality of antennas to the computing device at a time.

FIG. 2 shows a block diagram of a positioning of two antennas of neighboring storage elements. A first storage element (not shown) may be equipped with a first RFID chip 102, a connection 204 between the RFID chip and a reflector 206. Within the reflector 206, a coil 208 may be positioned for charging and communication purposes. A neighboring storage element (also not shown) comprises another coil 208 in a respective reflector 206. This other coil 208 is connected to the RFID chip 202 (or computing device) via connection 210. With the help of the two coils 206, 208 a communication from RFID chip to RFID chip, i.e., from storage element to storage element is possible. In this sense, the reflector/coil combination may be seen as a substitute for one of the antennas integrated in each storage element.

FIG. 3 shows a block diagram of a top view of an array of storage elements 302, 304, . . . , 316. Each storage element is enabled to communicate to a neighboring storage element via the communication channel of two opposing antennas, as shown in the circle 318.

FIG. 4 shows a block diagram of an embodiment of a plurality of storage elements 100 in a high rack warehouse 402. The rack itself is not shown but only the pallets—i.e., storage elements 100—in four different layers. At each front side of the pallets (assumed here, it is the right side) and in every layer of the high rack, the right most antennas 106 are accessible. A communication connection to this antenna 108 may be established from/by an RFID antenna/rear 404 embedded at a front section of the fork 410 of a forklift 408. In addition, another antenna 108 is exemplarily shown in one of the middle storage elements 100, i.e., pallets.

It may be noted that the RFID reader may also be integrated in an autonomous flying drone or a handheld device for reading out the inventory of a complete layer of storage elements positioned in a two-dimensional matrix in that layer. As discussed above, it may not be required that the storage elements are stored in a high rack. The proposed concept also supports the reading out of the memory of the computing devices of the storage elements if the storage elements are placed at any other supporting ground.

FIG. 5 shows an embodiment of the computing device/RFID chip 102 connected to the switch controller 510 and a plurality—in this example 4—resonance circuits, one for each side of a rectangular of the storage element. The resonance circuits can be seen as parts of the antennas or the other way around. The resonance circuits 502, 504, 506, 508 are shown with an inductance and a capacitor. The inductances may be the same as the coils 208 shown in FIG. 2.

Advantageously, the resonance circuit may e.g., be trimmed to 13.56 MHz, the typical frequency for RFID chips. The switch controller 510 controls an electronic switch 512 so that—in a sending mode of the RFID chip 102—only one of the resonance circuits 502, . . . , 508 is connected with the RFID chip. That way, a directed communication to a specific one of neighboring storage containers becomes possible. It may be noted that the resonance circuits are shown without a dedicated signal amplifier. However, it may be useful to position a signal amplifier close to the resonance circuit, so that each resonant circuit may be linked directly to a respective signal amplifier. It may be noted that the switch 512 may be integrated into the switch controller 510 or not.

FIG. 6 shows an exemplary placement of a plurality of storage elements 602, . . . , 618. It may be noted that the matrix or array of storage elements is packed in a compact way such that, e.g., between the storage elements 606, 608, 616, 610, no space is left for personnel to check the inventory of each storage element manually or electronically.

It may be assumed that the storage element 602 is the start element for reading out the data stored in the memory of the RFID chips of the storage elements 602, . . . , 618. As mentioned above, an RFID reader may be placed in front of the storage element 602, as shown by arrow 620. The RFID chip of the storage element 602 may be activated so that the content—e.g., the unique identifier of the related RFID chip, as well as their stored inventory data of goods housed by the storage element 602, may be read out by the RFID reader. The required reader may also be part of a high rack.

Furthermore, the RFID reader may instruct the first computing device/RFID chip of the storage element 602 to read-out the remaining ones of the other storage elements. A store and forward technology may be used in order to pass the instruction to read-out the data of the RFID chips from RFID chip to RFID chip via the opposing antennas from one storage element to a neighboring storage element. A plurality of algorithms for covering the complete array of storage element 602, . . . , 618 are possible. For example, the sequence may be storage element 602→604→606→608→610→612→614→616, and so on. The store-and-forward technique may be token-based so that the command for reading out a specific RFID chip is accompanied by a position token. If, e.g., the initiating RFID reader at position 620 wants to read-out the inventory of storage element 610, the read-out command may be transmitted from storage element to storage element together with a token vector defining the position of the storage element in the array of storage elements. In this case, the token may comprise the value "4" for a forward position and a value "2" for a "right position". Each time the token is forwarded from RFID chip to RFID chip, i.e., from storage container to storage container, the respective counter is reduced by a value of 1. In case the counter reaches a value of zero, the respective row and/or column has been reached. Now, the unique ID and inventory data are read-out of the RFID chip and the data travel back to the RFID reader positioned at position 620 with the token technology in the opposite direction if compared to the original direction.

It may be noted that the transmission power and receiving sensitivity of an antenna of each storage system may be increased to a level such that also empty places—i.e., positions in the array where no storage containers are placed—may be crossed. This way, a potentially missing storage container may be approached via another neighboring storage element from a different direction in order to confirm that this spot in the array is indeed empty. On the other side, the strategy may be useful for detecting malfunctioning antennas of the storage elements.

The store-and-forward approach, as discussed above, is illustrated in FIG. 5 by the "f" arrows for a "forward" direction and the "r" command for a "right" direction. The used algorithm to move from storage element to storage element may also be enabled to move in a "l"eft direction or a "b"ackward direction. That way, commands, tokens, unique IDs and inventory data may be moved from storage element to storage element, i.e., from RFID chip to RFID chip in any order from one storage element to other neighboring storage elements.

If the RFID reader of the, e.g., forklift is positioned at arrow 622 the RFID chip, comprised in the storage element 618, may detect no additional surrounding storage elements. If this is the case, or if no unknown RFID chips/storage elements are available right beside a storage element, it may be concluded that the last storage element in the array has been reached.

Such a determination may also be used to change the direction of the passing command. As an example: the storage container 608/the respective RFID chip may determine that no further storage element is available in the f(orward) direction. Hence, the direction to pass the command further through the array of storage elements is changed from f(orward) to r(ight). A skilled person will understand that the compact array of storage elements may be scanned column by column, row by row or in a mixed mode. As explained above, that way, also empty spaces in the array are detectable as well as defect antennas of the RFID chips/the storage elements.

FIG. 7 shows a related method 700 for handling or managing storage elements. The storage elements are adapted for housing goods and they are adapted to be stored, 702, compact in at least two dimensions. The plurality of storage elements may be positioned—or stored physically—in a plane in at least two dimensions, e.g., horizontally in the rack, on a truck, etc., 702.

The method 700 comprises further storing, 704, at least a unique identifier value and data about the goods housed by one of the plurality of storage elements in a computing device integral to the one storage element. Each of the computing devices comprises a memory. A plurality of antennas is mounted laterally at an outer side of each of the plurality of the storage elements. The antennas are electrically connected, 706, to the related computing device integrated in each respected one of the plurality of storage elements by a switch controller.

In case the storage container may have only three sides—a triangle container—or in case of a round container, the number of antennas per computing device/RFID reader may be decreased or increased.

The method 700 comprises further communicating, 708, data from one computing device integral to a first storage element to a computing device integral to a neighboring storage element via one of the plurality of antennas of the first storage element to the neighboring storage element via a corresponding one of the plurality of the antennas of the neighboring storage element. Thus, commands and communication data may be transmitted from one storage element to another storage element, e.g., the respective unique ID of a storage element/RFID chip, as well as the related inventory data describing the content transported with the respective storage element/pallet/container.

Embodiments of the invention may be implemented together with virtually any type of computer, regardless of the platform being suitable for storing and/or executing program code. FIG. 8 shows, as an example, a computing system 800 suitable for executing program code related to the proposed method. The computing system 800 may be integrated in an RFID chip, another single chip computer or single board computer which may each be positioned within a respective storage element.

The computing system 800 is only one example of a suitable computer system and is not intended to suggest any limitation as to the scope of use or functionality of embodiments of the invention described herein. Regardless, computer system 800 is capable of being implemented and/or performing any of the functionality set forth hereinabove. In the computer system 800, there are components, which are operational with numerous other general purpose or special purpose computing system environments or configurations. Examples of well-known computing systems, environments, and/or configurations that may be suitable for use with computer system/server 800 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 800 may be described in the general context of computer system-executable instructions, such as program modules, being executed by a computer system 800. Generally, program modules may include routines, programs, objects, components, logic, data structures, and so on that perform particular tasks or implement particular abstract data types. Computer system/server 800 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 800 is shown in the form of a general-purpose computing device. The components of computer system/server 800 may include, but are not limited to, one or more processors or processing units 802, a system memory 804, and a bus 806 that couples various system components including system memory 804 to the processor 802. Bus 806 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 800 typically includes a variety of computer system readable media. Such media may be any available media that is accessible by computer system/server 800, and it includes both, volatile and non-volatile media, removable and non-removable media.

The system memory 804 may include computer system readable media in the form of volatile memory, such as random access memory (RAM) 808 and/or cache memory 810. Computer system/server 800 may further include other removable/non-removable, volatile/non-volatile computer system storage media. By way of example only, storage system 812 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 806 by one or more data media interfaces. As will be further depicted and described below, memory 804 may include at least one program product having a set (e.g., at least one) of program modules that are configured to carry out the functions of embodiments of the invention.

The program/utility, having a set (at least one) of program modules 816, may be stored in memory 804 by way of example, and not limitation, as well as an operating system, one or more application programs, other program modules, and program data. Each of the operating system, one or more application programs, other program modules, and program data or some combination thereof, may include an implementation of a networking environment. Program modules 816 generally carry out the functions and/or methodologies of embodiments of the invention as described herein.

The computer system/server 800 may also communicate with one or more external devices 818 such as a keyboard, a pointing device, a display 820, etc.; one or more devices that enable a user to interact with computer system/server 800; and/or any devices (e.g., network card, modem, etc.) that enable computer system/server 800 to communicate with one or more other computing devices. Such communication can occur via Input/Output (I/O) interfaces 814. Still yet, computer system/server 800 may communicate with one or more networks such as a local area network (LAN), a general wide area network (WAN), and/or a public network (e.g., the Internet) via network adapter 822. As depicted, network adapter 822 may communicate with the other components of computer system/server 800 via bus 806. It should be understood that although not shown, other hardware and/or software components could be used in conjunction with computer system/server 800. Examples, include, but are not limited to: microcode, device drivers, redundant processing units, external disk drive arrays, RAID systems, tape drives, and data archival storage systems, etc.

Additionally, an antenna 104, 106, 108, 110 may be connected to the switch controller 510 and/or the switch 512.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A storage element for a warehouse rack, wherein said storage element is adapted for housing goods and wherein said storage element is adapted to be stored compact in at least two dimensions, said storage element comprising:
   a rectangular platform for housing said goods on said warehouse rack in a plane of at least two dimensions;
   a computing device comprising a memory storing at least a unique identifier and data about said goods housed by said storage element; wherein said computing device is positioned in a center portion in a horizontal plane and below a surface element of said storage element,
   a plurality of antennas external to said computing device, said antennas mounted at outer sides of said storage element such that respective ones of said antennas are mounted symmetrically on each lateral side in a vertical plane of said storage element, said plurality of antennas each electrically connected via an independent wire to said computing device positioned in said center and below said surface element of said storage element such that said independent wires run from said computing device along said horizontal plane and below said surface element to said respective ones of said antennas, wherein said antennas of said storage element are adapted for a communication to said antennas of additional neighboring storage elements to the storage element, and
   a switch controller adapted for switchable connecting of one of said plurality of antennas to said computing device at a time.

2. The storage element according to claim 1, wherein said computing device is connected to a rechargeable battery.

3. The storage element according to claim 2, wherein said rechargeable battery is charged by an RFID reader.

4. The storage element according to claim 2, wherein said rechargeable battery is charged by a voice coil charger.

5. The storage element according to claim 2, wherein said switch controller is also adapted for connecting said plurality of antennas to said rechargeable battery at a same time in a receiving mode of said computing device.

6. The storage element according to claim 1, wherein said computing device is an RFID chip comprising a processing unit and an integrated RF receiver, and wherein said antennas are RFID antennas.

7. A method for managing a plurality of storage elements, wherein said storage elements are adapted for housing goods, and wherein said storage elements are adapted to be stored compact in at least two dimensions, said method comprising:
   positioning said plurality of storage elements, said plurality of storage elements each comprising a rectangular platform for housing said goods on a warehouse rack in a plane of at least two dimensions,
   storing at least a unique identifier value and data about said goods housed by each one of said plurality of storage elements in a computing device integrated into each respective one of said plurality of storage elements, said computing device comprising a memory and said computing device being positioned in a center portion in a horizontal plane and below a surface element of said storage element, wherein a plurality of antennas are mounted at an outer side of each of said plurality of said storage elements such that respective ones of said antennas are mounted symmetrically on each lateral side in a vertical plane of said storage element, said plurality of antennas each electrically connected via an independent wire to said computing device positioned in said center and below said surface element of said storage element such that said independent wires run from said computing device along said horizontal plane and below said surface element to said respective ones of said antennas,
   connecting, by a switch controller, one of said plurality of said antennas to said computing device, and
   communicating data from a first respective computing device integrated into a first one of said plurality of storage elements to a second respective computing device integrated into a neighboring, second one of said plurality of storage elements via one of said antennas of said first one of said plurality of storage elements to said neighboring, second one of said plurality of storage elements via a corresponding one of said antennas of said neighboring, second one of said plurality of said storage elements.

8. The method according to claim 7, wherein said data communicated from said first respective computing device integrated into said first one of said plurality of storage elements to said second respective computing device integrated into said neighboring, second one of said plurality of storage elements comprises said unique identifier and data about said goods housed by said first one of said plurality of said storage elements.

9. The method according to claim 7, wherein said data of said plurality of computing devices are activatable and readable by an external antenna.

10. The method according to claim 7, also comprising:
connecting each of said computing devices to a rechargeable battery, and
charging said rechargeable battery by an RFID reader and/or by a voice coil charger.

11. The method according to claim 7, wherein each of said computing devices is an RFID chip comprising a processing unit and an integrated RF receiver, and wherein said method also comprises connecting all of said plurality of antennas of said storage elements to all of said computing devices at a same time in a receiving mode of said rechargeable battery.

12. A computer program product for managing a plurality of storage elements, wherein said storage elements are adapted for housing goods, wherein said storage elements are adapted to be stored compact in at least two dimensions, and wherein said storage elements are positioned in a plane of at least two dimensions, said computer program product comprising a computer readable storage medium having program instructions embodied therewith, said program instructions being executable by one or more computing systems to cause said one or more computing systems to:
store at least a unique identifier value and data about said goods housed by one of said plurality of storage elements in a computing device integrated into each respective one of said plurality of storage elements, said plurality of storage elements each comprising a rectangular platform for housing said goods on a warehouse rack in a plane of at least two dimensions, said computing device comprising a memory and said computing device being positioned in a center portion in a horizontal plane and below a surface element of said storage element, wherein a plurality of antennas are mounted at an outer side of each of said plurality of said storage elements such that respective ones of said antennas are mounted symmetrically on each lateral side in a vertical plane of said storage element, said plurality of antennas each electrically connected via an independent wire to said computing device positioned in said center and below said surface element of said storage element such that said independent wires run from said computing device along said horizontal plane and below said surface element to said respective ones of said antennas,
connect by a switch controller, one of said plurality of said antennas to said computing device, and
communicate data from a first respective computing device integrated into a first one of said plurality of storage elements to a second respective computing device integrated into a neighboring, second one of said plurality of storage elements via one of said antennas of said first one of said plurality of storage elements to said neighboring, second one of said plurality of storage elements via a corresponding one of said antennas of said neighboring, second one of said plurality of said storage elements.

* * * * *